April 9, 1929.  L. F. HOLLY  1,708,176
APPARATUS AND METHOD FOR LOADING LOOSE BULK CARGOES
Filed May 1, 1926  2 Sheets-Sheet 1
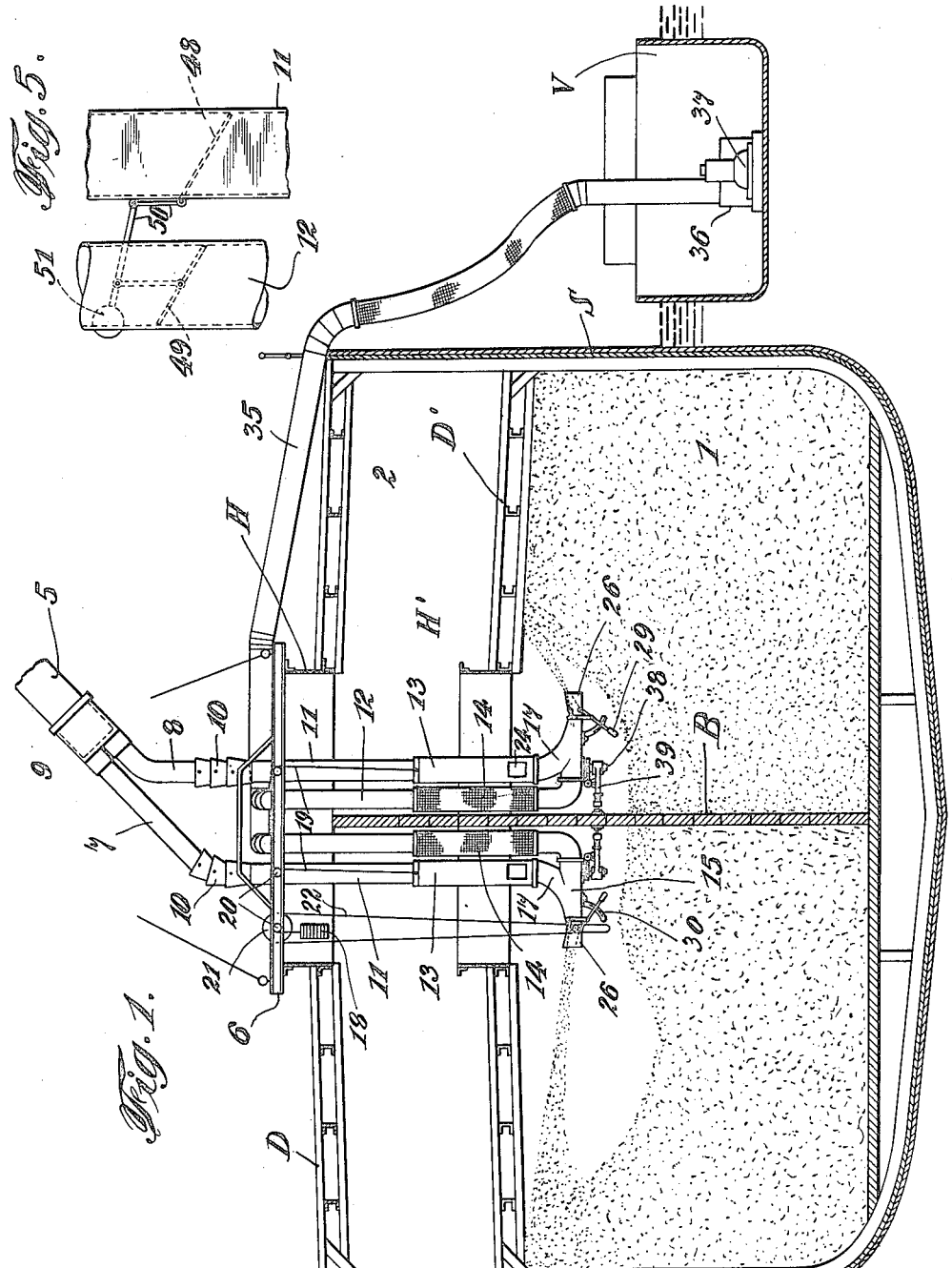
INVENTOR
L.F. Holly
BY
his ATTORNEY

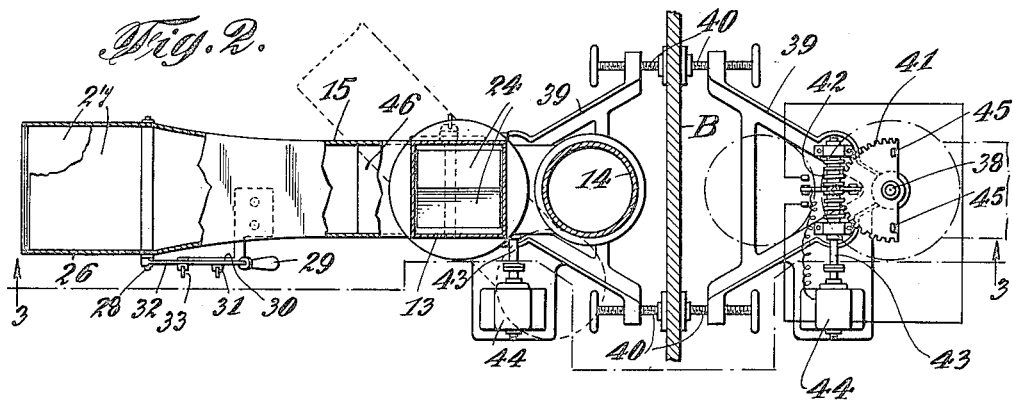
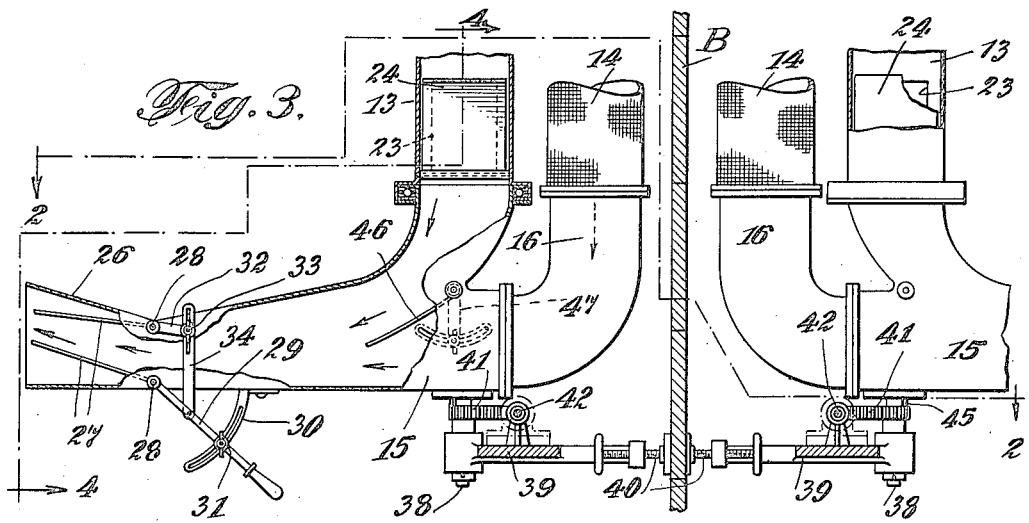
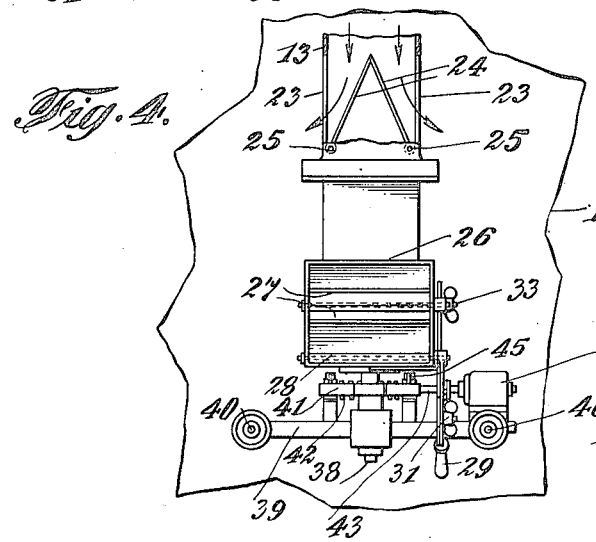

Patented Apr. 9, 1929.

1,708,176

UNITED STATES PATENT OFFICE.

LUDWIG F. HOLLY, OF MADISON, NEW JERSEY, ASSIGNOR TO HOLLY PNEUMATIC SYSTEMS, INC., OF NEW YORK, N. Y., A CORPORATION OF NEW YORK.

APPARATUS AND METHOD FOR LOADING LOOSE-BULK CARGOES.

Application filed May 1, 1926. Serial No. 105,936.

This invention relates to an apparatus and method for loading loose bulk cargoes such as coal, grain, nuts, etc., and has for its primary object to provide a simple and efficient method for trimming the cargo so that the hold of the vessel will be filled to its full capacity.

Heretofore, when loading such loose bulk cargoes into the hold of the vessel or steamer, only a certain part thereof, depending upon the shape of the hold and the angle of repose of the material, can be filled in by gravity. In order to fill the remaining space in the hold, it is necessary to trim the cargo. This is now done by shoveling the material from under the hatch to all corners of the hold up to the deck. Obviously, such shoveling operations consume a great amount of time and labor, as only a certain number of men can be put into the hold, and the steamers are therefore, held or retained in port unduly long.

It is the primary object and purpose of my present invention to provide a novel method and a comparatively simple form of apparatus for accomplishing the same whereby the time, labor and expense incident to loading such loose bulk cargoes into the holds of vessels or steamers and properly trimming the cargo will be very materially reduced.

To the above end, the invention contemplates, in its broader aspects, the proper distribution of the loose bulk cargo material and more particularly of the upper trimming portion thereof within the hold of the vessel under pneumatic pressure, and more particularly, I propose to effect such distribution by the adjustment of the forcibly ejected stream of material in both vertical and horizontal directions.

It is another object of the invention to provide an apparatus for loading and trimming the cargo in accordance with my new method embodying an improved construction and arrangement of the material and compressed air conduits and a novel form of ejecting nozzle connected with the lower ends of said conduits and having an adjustable outlet for varying the velocity and trajectory of the stream of ejected material.

Additional objects of the invention are to provide improved means for counteracting the severe forces of reaction incident to the use of compressed air as the ejecting medium, and the deflection of flowing masses, to provide an improved construction of the material and air conduits whereby the ejecting nozzle may be vertically adjusted in the hold of the vessel, to provide improved means for automatically swinging the ejector nozzle horizontally from the lower ends of said conduits and reversing the direction of such swinging movement, and to provide simple means for removably supporting the apparatus in operative position on the hatch and connecting the same with a power unit carried by a separate vessel or barge.

With the above and other objects in view, the invention consists in the improved method and apparatus for loading and trimming loose bulk cargoes, and in the form, proportion and relative arrangement of the several parts of such apparatus, as will be hereinafter more fully described, illustrated in the accompanying drawings, and subsequently incorporated in the subjoined claims.

In the drawings, wherein I have illustrated one typical example of apparatus for carrying out my new method, and in which similar reference characters designate corresponding parts throughout the several views,—

Figure 1 is a transverse sectional view through a vessel showing the cargo loading and trimming equipment mounted in operative relation therewith;

Fig. 2 is an enlarged horizontal section taken substantially on the line 2—2 of Fig. 3, and one of the ejector nozzles being shown partly in section;

Fig. 3 is an enlarged lower end elevation of certain parts of the apparatus, parts thereof being shown in section;

Fig. 4 is an end elevation, the lower end of the material conduit being shown in section, and Fig. 5 is a detail view illustrating an automatic damper arrangement for the material and air conduits which is employed when a centrifugal air pump is used.

In the drawings, for purposes of illustration, I have shown a steamer or vessel S having an upper deck D provided with a hatch H and an intermediate deck D' also having a hatch H' spaced from the upper deck. Thus, it will be understood that there is provided a lower or main hold 1 of large capacity and an upper hold 2 of relatively small capacity. However, it will of course, be understood that the structure of the vessel or the number, size or shape of the cargo receiving holds thereof is of no importance, as my new method and apparatus is equally adaptable to various types or constructions of such freight steamers or vessels.

A lower end section of the usual marine spout 5 is shown through which the material is fed by gravity from an elevator, bunker or other holder therefor. The apparatus constituting part of the subject matter of this application, as herein shown includes suitably spaced beams as indicated at 6, which are adapted to be supported at their opposite ends upon the walls of the hatchway H as clearly shown in Fig. 1 of the drawings. These beams may be connected by any suitable means with a hoisting apparatus whereby the loading and trimming equipment mounted upon said beams may be conveniently lowered into the hold of the vessel, or lifted therefrom.

A breaching having spaced tubular branches 7 and 8 respectively, is connected at its upper end by a sleeve or other suitable joint member 9 with the lower end of the spout 5, and these breaching tubes are respectively connected at their lower ends by the flexible or articulated joints 10 with the upper ends of the spaced cargo loading conduits 11. In the example of apparatus which I have selected for purposes of illustration, the vessel S is provided with a longitudinally extending bulk head B which divides the holds 1 and 2 into two sections, and the loading and trimming equipment therefor includes duplicate parts for simultaneously loading and trimming the cargo in the two sections of the hold. Therefore, it will be understood that when the apparatus is arranged in position on the hatch H, the loading conduits 11 which are suitably mounted at their upper ends between the beams 6 extend downwardly at opposite sides of the bulk head B.

An air conduit 12 is associated with each of the loading conduits 11 and is disposed in parallel relation therewith, said air conduits being likewise suitably mounted at their upper ends between the beams 6. Upon the conduits 11, the sleeves 13 are telescopically engaged for vertical sliding movement and a flexible tube 14 is also telescopically slidable upon each of the air conduits 12.

An ejector nozzle 15 is connected at its rear end by a suitable swivel joint with the tubular elbow 16 connected to the lower end of the flexible tube 14. The rear end of said nozzle is also provided with an upwardly extending branch 17 having a swivel connection with the lower end of the tube or sleeve 13 connected with the loading conduit 11. The weight of the movable parts of the apparatus is counterbalanced by weight or weights 18 connected with one end of the cables 19, the other ends of which are respectively attached to the upper ends of the sleeves or tubes 13. These cables are trained over suitable pulleys 20, one of said pulleys having a shaft extension to which a larger pulley 21 is fixed over which an endless chain 22 is engaged. By moving this chain in the proper direction, the ejecting nozzles 17 may be raised or lowered and the vertical position thereof properly adjusted in the hold.

For the purpose of filling the major portion of the cargo by gravity into the hold of the vessel which may be properly so filled therein, I provide each of the sleeves 13 adjacent its lower end and at opposite sides thereof with an opening 23 and each of these openings is provided with an inwardly opening door or closure 24 hingedly mounted at its lower end as at 25 upon the wall of the sleeve 13 at the lower edge of the opening 23. When these doors 24 are in their open positions as shown in Fig. 4 of the drawings, it will be seen that the material falling by gravity through conduit 11 and sleeve 13 is divided into two streams and directed outwardly through the openings 23 into the hold of the vessel.

The ejector nozzle 15 at its outlet end has its top wall upwardly inclined as shown at 26 and within this outlet end of the nozzle, the vertically spaced plates 27 are pivotally mounted at their rear ends as at 28. To one end of the pivot rod or axis of the lower plate 27 a lever 29 is fixed and is adapted for movement over a curved slotted arm 30 fixed to the wall of the ejector nozzle, said lever carrying an adjustable clamping means 31 extending through the slot of said arm whereby the lever may be fixed in various adjusted positions.

The upper plate 27 has an arm 32 fixed to one end of its pivot rod or axis and projecting rearwardly therefrom, said arm having an adjustable pin and slot connection 33 with one end of a link 34 which is pivotally connected at its other end to the lever 29. From this construction, it will be evident that by adjusting the connection between the arm 32 and link 34, the upper plate 27 may be independently adjusted in the outlet of the ejecting nozzle with respect to the lower plate 27 so that said plates will bear a desired convergent relation to each other and thus determine the area between the forward ends of said plates to regulate the discharge velocity of the material. By adjusting the lever 29 on the arm 30, the two plates 27 may be moved as a unit in the outlet end of the nozzle, thereby varying the inclination of the lower plate and changing the trajectory of the ejected stream of material as may be required in order to fill the farthest corners or spaces in the hold of the vessel.

Air is supplied under pressure to the conduit 12 and the flexible sleeve 14 through the rigid and flexible pipe sections or conduits 35, by means of a suitable air compressor or pump 36 operated by a power unit 37 carried by the barge or other vessel V moored along side of the steamer S to be loaded. It will, of course, be understood that in the illustrated embodiment of the apparatus, the air supply conduit 35 has an area substantially twice the area of the two conduits 12 which are connected therewith. Also, while I have shown only a single apparatus, it will be understood that the arrangement illustrated might be multiplied for simultaneously loading all of the holds of the vessel from a single power unit.

For the purpose of horizontally swinging the ejector nozzle 15 so as to distribute the stream of the cargo material to all corners of the hold, the said nozzle adjacent its rear end has a vertical spindle 38 fixed thereto rotatably mounted in a bracket 39. This bracket is provided with spaced diverging arms, in the ends of which adjustable screws 40 are threaded for bearing engagement against one side of the longitudinal bulk head B of the vessel, or against each other.

Upon the spindle 38 a gear segment 41 is fixed and meshes with a worm 42 on the shaft 43. As herein shown, this shaft is driven by an electric motor 44 and the gear 41 carries suitable reversing switch contacts indicated at 45 whereby the operation of the motor is automatically reversed to thereby reverse the rotational movement of the spindle 38 and consequently the swinging movement of the ejector nozzle 15. It will be understood of course, that the axis of the vertical spindle 38 coincides with the vertical axis of the material feed conduit 11 and the telescoping sleeve 13. The forces of reaction created by the change of direction of the pneumatically ejected stream of material are transmitted to the brackets 39 and through the adjustable screws 40 to the bulk head B. The bearing screws 40 of the devices on opposite sides of the bulk head being in opposed relation to each other, these forces are counteracted so that the apparatus will be maintained in a stationary position relative to the bulk head, and to eliminate undesirable forces on the vertical chutes. It will be understood that the worm shaft 43 and motor 44 are suitably mounted upon the bracket 39.

For the purpose of regulating the volume and velocity of the air entering the rear end of the nozzle 15 whereby the stream of material may be ejected to the desired distance, I provide in the rear end of the nozzle the adjustable tongue or plate 46 pivotally mounted at one of its ends and having a lever 47 connected therewith whereby said plate or tongue may be disposed in various angular positions to increase or decrease the area of the air ingress opening to said nozzle. It will also be observed that in the adjustment of plate 46, the quantity of material entering the nozzle from the sleeve or conduit 13 will be varied. In other words, as the velocity of the entering air blast is increased in the adjustment of this plate, the quantity of the material entering the nozzle is correspondingly increased.

In case an air pump of the centrifugal type is used, damper plates 48 and 49 are arranged in the material and air conduits 11 and 12 respectively, said conduits being preferably of square or rectangular form. These damper plates are connected for simultaneous operation by the articulated lever elements 50 provided with a counterweight 51. When no material is flowing through the conduit 11, both damper plates are held in closed position by the counterweight 51. As soon as the grain or other material enters the conduit 11, the weight thereof moves the damper plate 48 to open position, and through the lever connections 50 the damper plate 49 in the air conduit is simultaneously moved to its open position, thus permitting the air to flow through the latter conduit without obstruction to the ejector nozzle. This damper plate arrangement operates to prevent overload of the power unit when no material is entering the ejector nozzle.

In the use of the apparatus above described, the loading conduits may be conveniently carried upon a suitable supporting structure provided on the barge or other vessel V and lifted therefrom by a suitable hoist and placed in proper position on the hatch H and in the hold of the vessel to be loaded. By operating the chain 22, the ejector spouts are then disposed at the desired vertical elevation to insure a maximum throw for the trimming layer of the material. After adjusting screws 40 to tighten the pressure plates thereof against opposite sides of the bulk head or against each other in case the hold is not divided by a bulk head, the closures 24 are then moved inwardly to open position so that the material is loaded by gravity through the openings 23. During this gravity flow of the cargo, the proper connections are made between the air pump 36 and the conduits 12. After the hold has been loaded for the greater part of its capacity by gravity flow of the material, the air pump is started in operation so as to supply air under high pressure through conduits 12 and the flexible sleeves 14 to the ejector nozzles, and then the doors or gates 24 are closed. The circuits of motors 44 are also closed by a suitable control switch so that as the material is ejected through the nozzles at a high rate of speed by the air entering the rear ends of said nozzles, the latter are alternately swung back and forth in a horizontal plane so as to thus effect a more or less equal distribution of the cargo material and fill up the remote corners or spaces of the hold. As the hold gradually fills up, it becomes necessary to adjust the angle of the discharge control plates 27 to increase the height of the throw of the stream of the material, as it gradually backs up and reaches the trimming equipment.

The operation of the air pump is now stopped and the gates or doors 24 again opened so that the cargo material again flows into the hold by gravity and at the same time the ejector nozzles are gradually withdrawn from the hold until the hold is completely filled to the under side of the deck.

It will be seen from the above description that my new method of loading and trimming such loose bulk cargoes is carried out in three successive steps, namely, the greater part of the cargo is loaded by gravity, then the outer side parts of the hold are filled and trimmed by the distribution of the material under pneumatic pressure, and finally the space occupied by the trimming equipment is filled by the gravity flow of the material. Thus, I am enabled to materially conserve time and labor in the filling of cargo vessels, reducing the necessary number of men for such operation, so that it becomes possible to load the vessel and permit its release from port in appreciably less time than has heretofore been possible.

From the foregoing description considered in connection with the accompanying drawings, the construction, manner of operation and several advantages of my present improvements will be clearly and fully understood. While I believe the apparatus as illustrated in the accompanying drawings is entirely practical for the purpose in view, it is nevertheless, possible that in so far as my new method is concerned, various other alternative forms of apparatus might be employed, and it is therefore, to be understood that such apparatus may be exemplified in numerous other structural embodiments than that herein specifically described, and I accordingly reserve the privilege of resorting to all such legitimate changes therein as may be fairly embodied within the spirit and scope of the invention as claimed.

I claim:

1. In an apparatus for trimming loose bulk cargoes, a discharge nozzle for the cargo material, means for feeding the material by gravity to said nozzle, means for rotatably supporting said nozzle at its rear end, means for supplying air under pressure to the rear end of the nozzle to forcibly discharge the material therefrom in a horizontally directed stream, means for swinging said nozzle in a horizontal arcuate path to distribute the ejected stream of material uniformly to all parts of the hold of the vessel, and means for bracing the nozzle to counteract the forces of reaction occurring in the swinging movement of said nozzle.

2. In an apparatus for trimming loose bulk cargoes, a discharge nozzle for the cargo material, means for feeding the material by gravity to said nozzle, means for supplying air under pressure to the rear end of the nozzle to forcibly discharge the material therefrom in a horizontally directed stream, vertically spaced plates pivotally mounted at one of their ends in the discharge end of said nozzle and between which the material is discharged, means for adjusting one of said plates independently of the other to vary their angular relation to each other, and means for adjusting said plates as a unit in the discharge end of the nozzle to change the angle of discharge of the material from said nozzle.

3. In an apparatus for loading and trimming loose bulk cargoes, a vertical gravity feed material conduit, a vertical air supply conduit, a discharge nozzle, a telescoping connection between said nozzle and the material feeding conduit, a telescoping connection between the rear end of said nozzle and the air conduit, said connections between the nozzle and the conduits permitting vertical movement of said nozzle relative to said conduits, adjustable means for directing the gravity flow of the material into the hold of the vessel or into said nozzle, means for supplying air under pressure to the rear end of the nozzle to forcibly project the material horizontally from the nozzle to all parts of the hold of the vessel, and means for vertically adjusting said nozzle relative to the conduits as the hold of the vessel is filled.

4. In an apparatus for loading and trimming loose bulk cargoes, a supporting structure adapted to be positioned over the hatch of the vessel, a material feeding conduit mounted in said structure, an air supply conduit mounted in said structure, a discharge nozzle, said material feeding conduit including a vertically slidable section having a rotatable connection at its lower end with said nozzle, and said air conduit including a flexible, vertically slidable section connected with the rear end of said nozzle, adjustable means for discharging the material by gravity into the hold of the vessel or permitting the same to flow into said nozzle, means for vertically adjusting the nozzle in the hold of the vessel, and means for supplying air under pressure to said air conduit to forcibly project the material from the discharge end of the nozzle into all parts of the hold of the vessel.

5. In an apparatus for loading and trimming loose bulk cargoes, a supporting structure adapted to be positioned over the hatch of the vessel, a material feeding conduit mounted in said structure, an air supply conduit mounted in said structure, a discharge nozzle, said material feeding conduit including a vertically slidable section having a rotatable connection at its lower end with said nozzle, and said air conduit including a flexible section connected with the rear end of said nozzle, adjustable means for discharging the material by gravity into the hold of the vessel or permitting the same to flow into said nozzle, means for vertically adjusting the nozzle in the hold of the vessel, means for supplying air under pressure to said air conduit to forcibly project the material from the discharge end of the nozzle into all parts of the hold of the vessel, and operatively connected damper plates arranged in said material feeding and air conduits normally disposed in closed position and automatically moved to open position by the weight of the material when fed into the material feeding conduit.

6. In apparatus of the class described in combination with a discharge nozzle, a material conduit and an air conduit, both leading to the nozzle, of a valve in each conduit and means including a connection between the valves by which the valve in the air conduit is adjusted in accordance with the positioning of the valve in the material conduit under the influence of the flow of material therein.

7. In apparatus of the class described, a discharge nozzle, a material conduit connected to the nozzle, an air conduit also connected to the nozzle, a balanced valve in the air conduit, an unbalanced valve in the material conduit, and a connection between the valves whereby the air valve is closed in absence of material flowing through the material conduit and is opened by the flow of material in the material conduit acting upon the valve therein.

8. In apparatus of the class described, a discharge nozzle, a material conduit connected to the nozzle, an air conduit also connected to the nozzle, a balanced valve in the air conduit, an unbalanced valve in the material conduit, a connection between the valves whereby the air valve is closed in absence of material flowing through the material conduit and is opened by the flow of material in the material conduit acting upon the valve therein, and a counter-weight tending to move the valves to closed position.

9. In an apparatus for trimming loose bulk cargoes, a material feeding conduit adapted to be positioned vertically through the hatch of a vessel and having a discharge nozzle at its lower end, means carried by the lower end of said conduit for retaining the same in a stable position relative to a part of the structure of the vessel, said discharge nozzle being connected with the conduit by means permitting of the lateral oscillation of said nozzle in a horizontal plane, means for ejecting the material from the nozzle under pneumatic pressure, and means for oscillating said nozzle to uniformly distribute the ejected material in the hold of the vessel.

10. In an apparatus for trimming loose bulk cargoes, a material feeding conduit adapted to be vertically positioned through the hatch of a vessel, a discharge nozzle and means connecting said nozzle with the lower end of the conduit to permit of the lateral oscillation of the nozzle in a horizontal plane, means for ejecting material from the nozzle under pneumatic pressure, a motor support carried by said nozzle and having means to engage a wall of the vessel and retain the nozzle and feeding conduit in a stable position with respect thereto, a motor on said support, and means operatively connecting the motor with said nozzle to oscillate the latter and uniformly distribute the material in the hold of the vessel.

In testimony that I claim the foregoing as my invention, I have signed my name hereto.

LUDWIG F. HOLLY.